United States Patent
Pibhai et al.

(10) Patent No.: US 8,230,047 B2
(45) Date of Patent: Jul. 24, 2012

(54) USER INTERFACE SYSTEM AND METHOD FOR INTER-ROUTER PROTOCOL AND TRANSPORT CONFIGURATION

(75) Inventors: Rahim Pibhai, Ottawa (CA); Jeffrey Brassard, Nepean (CA)

(73) Assignee: Alcatel Lucent, Paris (FR)

( * ) Notice: Subject to any disclaimer, the term of this patent is extended or adjusted under 35 U.S.C. 154(b) by 1198 days.

(21) Appl. No.: 11/711,471

(22) Filed: Feb. 27, 2007

(65) Prior Publication Data

US 2008/0209334 A1 Aug. 28, 2008

(51) Int. Cl.
*G06F 15/177* (2006.01)
*G06F 15/16* (2006.01)
(52) U.S. Cl. ......... 709/220; 709/221; 709/227; 709/230
(58) Field of Classification Search .................. 709/220, 709/221, 227, 230
See application file for complete search history.

(56) References Cited

U.S. PATENT DOCUMENTS

| | | | | |
|---|---|---|---|---|
| 6,229,540 B1 * | 5/2001 | Tonelli et al. | ................. | 715/735 |
| 7,912,980 B1 * | 3/2011 | Pillay Esnault | ............... | 709/238 |
| 2003/0137532 A1 * | 7/2003 | Proulx et al. | .................. | 345/735 |
| 2005/0102423 A1 * | 5/2005 | Pelavin et al. | ................ | 709/238 |
| 2007/0237072 A1 * | 10/2007 | Scholl | ........................... | 370/222 |
| 2008/0056157 A1 * | 3/2008 | Retana et al. | ................. | 370/254 |

\* cited by examiner

*Primary Examiner* — Phuoc Nguyen
*Assistant Examiner* — Clarence John
(74) *Attorney, Agent, or Firm* — Ross D. Snyder & Associates, Inc.

(57) ABSTRACT

An interface system and method for creation and configuration of a connection between routers is provided. The interface comprises facility for entry of physical connection information, and entry of protocols selection and configuration information. Information for selection and configuring routing instances, network interfaces, and protocols for the connection is only requested from the user interface once before it is forwarded to an NMS to carry out the steps for actually setting-up the connection. Transport and protocol profiles for re-use with various physical connections are also provided.

20 Claims, 6 Drawing Sheets

USER INTERFACE SYSTEM AND METHOD FOR INTER-ROUTER PROTOCOL AND TRANSPORT CONFIGURATION

FIELD OF THE INVENTION

The invention relates to user interface systems and more particularly to a user interface system of a Network Management System (NMS) for configuring inter-router connections.

BACKGROUND OF THE INVENTION

Figure 1:
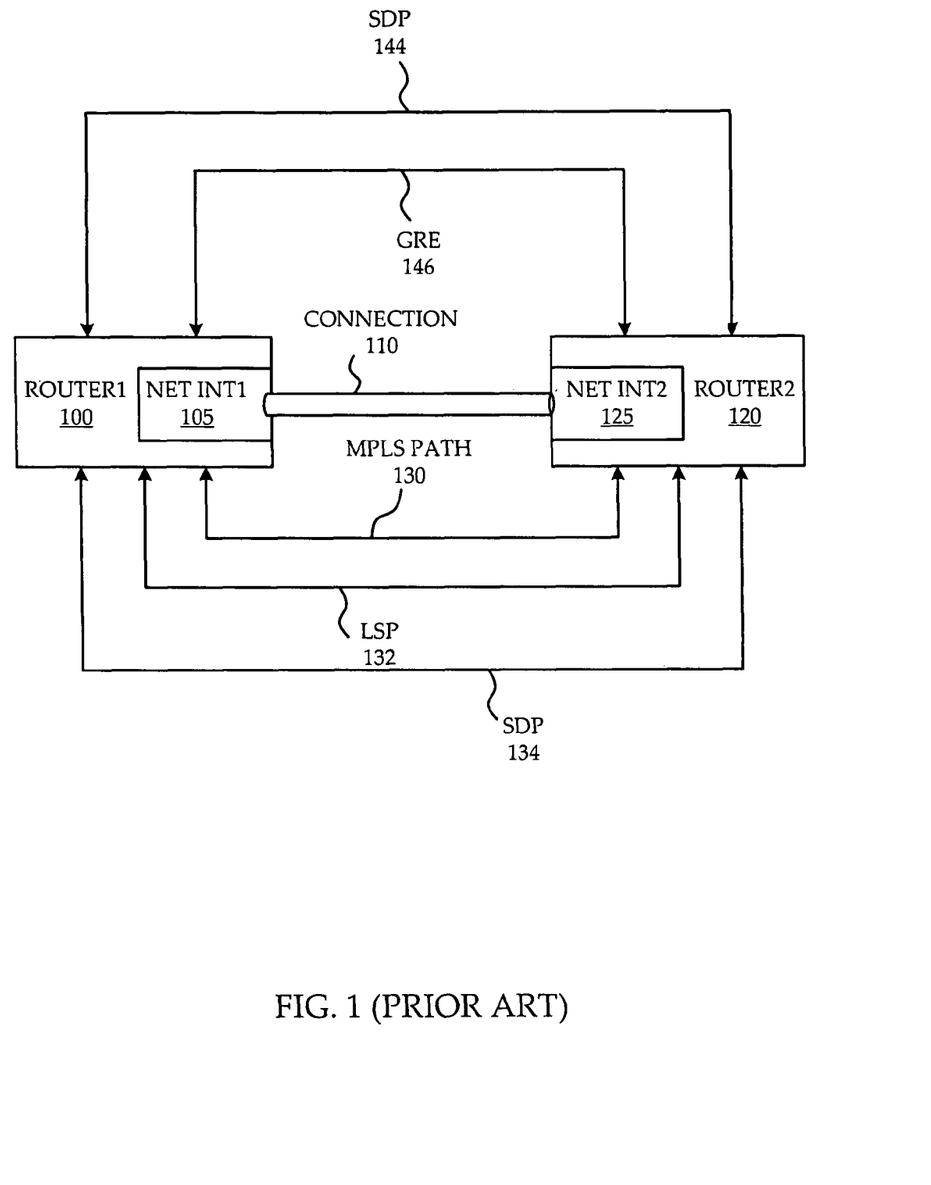
FIG. 1 is a block diagram illustrating an example of a known inter-router connection typically setup through an interface of an NMS.

One of the common tasks performed by a network management infrastructure of a telecommunications network is the set-up and configuration of a connection between routers. Examples of two types of connections between routers are shown in FIG. 1.

A first router 100 is connected with a second router 120 over a connection 110. The first router 100 has a first network interface 105 while the second router 120 has a second network interface 125. The connection 110 between the two network interfaces 105, 125 typically is one of two types of connection. The first type has GRE (generic routing protocol) transport 146 over which a service tunnel or SDP (service distribution path) 144 is maintained. The second has a service tunnel SDP 134 over an MPLS (multi-protocol label switching) path 130 with associated LSP (label switched path) 132.

Figure 2:
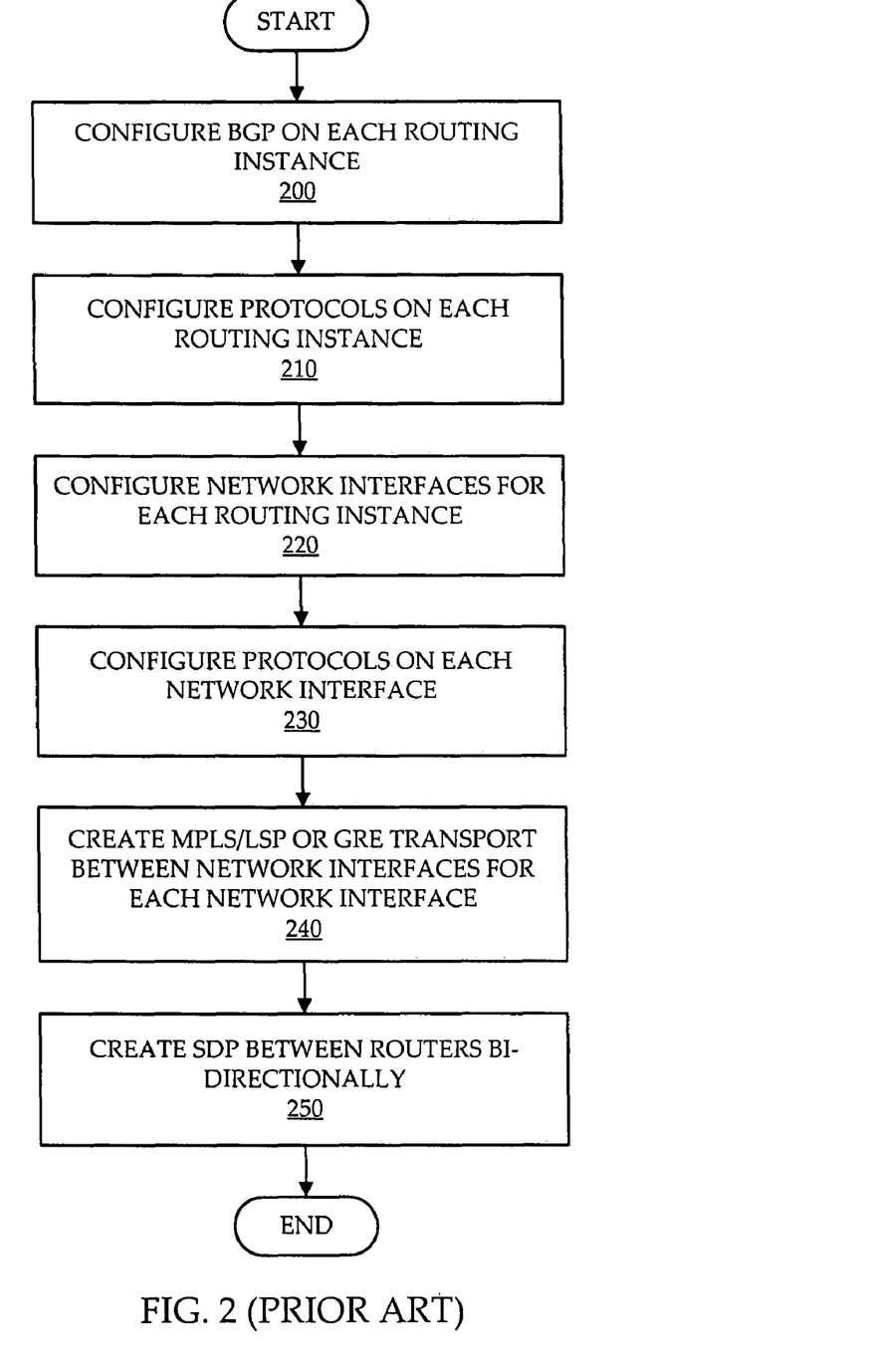
FIG. 2 is a block flow diagram illustrating the tasks which are performed to set-up a connection between two routers.

Independent of any particular user interface, certain tasks need to be performed in order to set-up these types of connections between the first router 100 and the second router 120. These tasks are shown in FIG. 2. At step 200, BGP (border gateway protocol) routing is configured on each routing instance. This is performed by determining if BGP routing is required, and if so, by determining if it has already been established, and if not, enabling it on each routing instance (first and second router) according to configuration settings. At step 210 protocols are configured on each routing instance. This is performed by determining which protocols are required, and by checking which protocols are already established on each routing instance, and for the required protocols not already established, enabling them on each routing instance. At step 220 network interfaces for each routing instance are configured. This is performed by determining if each network interface has already been established on its respective routing instance, and if a network interface has not already been established on its respective routing instance, creating it on its routing instance. For the first router 100 this corresponds to the first network interface 105, and for the second router 120 this corresponds to the second network interface 125. At step 230 the protocols are configured on each network interface. This is performed by checking which of the required protocols are already associated with each network interface, and for the required protocols not already associated with a network interface, associating them with the network interface. At step 240 the MPLS/LSP or GRE transport between the network interfaces is configured on each network interface of the connection. At step 250 the service tunnel or SDP between the routers is created bi-directionally (on each router).

Known NMSs (network management systems) provide for setting-up of the connections by providing user interfaces often GUIs (graphical user interfaces) and less commonly CLIs (command line interfaces) to facilitate performing these individual tasks. The manner is which known GUI systems are structured and how they operate is based largely on the structure and operation of the underlying command line interfaces which were originally in place before the migration to GUIs.

In known systems a GUI is provided for each created router instance, and if BGP (border gateway protocol) routing is required, a GUI is provided for each router instance to configure the BGP Autonomous System (AS), Confederation AS, and Member AS on the routing instance. Another GUI is provided for each routing instance to enable routing protocols such as BGP, MPLS/RSVP (resource reservation protocol), OSPF (open shortest path first), ISIS (intermediate system to intermediate system), LDP (label distribution protocol), and RIP (routing information protocol) as required on the routing instance. Other GUIs are provided to create and configure each network interface on each of the routers. For each network interface another GUI is provided to associate network protocols with the network interface. Yet another GUI is provided for associating the first network interface with the second network interface over MPLS and LSP transport (or alternatively over GRE transport) bi-directionally. Another GUI is provided for associating each LSP to its corresponding MPLS. Finally, a GUI is provided for creating and associating service tunnels or SDPs (bi-directionally) to their corresponding MPLS/LSP or GRE transport. In some known systems, the set-up and configuration of two routers for IP connectivity can require opening and entering data into as many as 60 graphical user interfaces. Such a task can be laborious and time consuming, and usually is inefficient and repetitious. The use of so many different GUI interfaces is a side-effect originating from the slow migration toward the use of GUIs from the use of CLI command interfaces in network management systems which treated router instances, network interfaces, network protocols and their configuration separately. As a result, known GUI systems continue configure the router instances, network interfaces, and network protocols of a connection as though they were unrelated, a type of treatment symptomatic of legacy CLI based systems.

SUMMARY OF THE INVENTION

According to one broad aspect, the invention provides for a user interface system for inter-router connection configuration in a communications network, the user interface comprising: a physical connection entry interface for one-time entry of physical connection information pertaining to a physical configuration of said inter-router connection; and a protocol entry interface for one-time entry of network protocol information pertaining to a networking protocols configuration of said inter-router connection.

In some embodiments of the invention the physical connection information identifies a first routing instance participating in said inter-router connection and a second routing instance participating in said inter-router connection, and wherein said physical connection information is for use in configuring a first network interface of said first routing instance and for use in configuring a second network interface of said second routing instance, said first and second network interfaces participating in said inter-router connection.

In some embodiments of the invention said network protocol information identifies a set of networking protocols for use over said inter-router connection, and wherein said network protocol information is for use in configuring said set of networking protocols.

Some embodiments of the invention further provide for a transport and protocol profile interface for selecting, editing, creating, saving, and deleting transport and protocol profiles wherein each transport and protocol profile comprises said network protocol information.

In some embodiments of the invention said networking protocol information is used to configure said set of network protocols on each of said first routing instance, said second routing instance, said first network interface, and said second network interface.

In some embodiments of the invention said first and second routing instance is identified by a respective first and second router ID of said physical connection information, and wherein said physical connection information comprises a first IO Card entry, a first Daughter Card entry, a first Port entry, and a first IP Address entry, for use in configuring said first networking interface, and a second IO Card entry, a second Daughter Card entry, a second Port entry, and a second IP Address entry, for use in creating and configuring said second networking interface.

In some embodiments of the invention said set of networking protocols comprises at least one of BGP, MPLS/RSVP, OSPF, ISIS, LDP, and RIP, and wherein said network protocol information comprises, in a case that said set of networking protocols comprises BGP, BGP configuration information, wherein said network protocol information comprises, in a case that said set of networking protocols comprises OSPF, OSPF configuration information, and wherein said network protocol information comprises, in a case that said set of networking protocols comprises MPLS/RSVP, LSP configuration information.

In some embodiments of the invention said BGP configuration information comprises a BGP Autonomous System setting, a Member Autonomous System setting, and a Confederation Autonomous System setting, and wherein said OSPF configuration information comprises an Area ID setting and a OSPF type setting, and wherein said LSP configuration information comprises an MPLS path selection and a reserved MPLS path bandwidth setting.

Some embodiments of the invention further provide for an interface element which when engaged initiates the use of said physical connection information and said network protocol information in the creation and configuration of said inter-router connection in said communications network.

In some embodiments of the invention, once said interface has been engaged, said first network interface is configured according to said physical connection information, said second network interface is configured according to said physical connection information, said first network interface is associated with said second network interface as participants in said inter-router connection, and said set of networking protocols is configured on said first and second routing instances and said set of networking protocols is configured on said first and second network interfaces.

In some embodiments of the invention said set of networking protocols is configured on said first and second routing instances by configuring BGP AS, Confederation AS, and Member AS on each routing instance in a case that said set of networking protocols includes BGP.

In some embodiments of the invention said set of networking protocols is configured on said first and second routing instances by checking which protocols of said set of protocols has not already been established on said first and second routing instances, and for protocols which have not been established on said first and second routing instances, enabling them on said first and second routing instances, wherein said set of networking protocols is configured on said network interfaces by checking which protocols of said set of protocols are already associated with each network interface, and for protocols which have not already been associated with said network interfaces, associating them with the network interfaces, and once said set of networking protocols has been associated with said first and second network interfaces, in a case that said set of networking protocols comprises MPLS/LSP, a bi-directional MPLS/LSP transport is created between the networking interfaces, and requested SDPs if any are created to ride the MPLS/LSP transport.

In some embodiments of the invention once said set of networking protocols has been associated with said first and second network interfaces, in a case that said set of networking protocols does not comprise MPLS/LSP, a bi-directional GRE transport is created between the networking interfaces, and requested SDPs if any are created to ride the GRE transport.

According to another broad aspect the invention provides for a method of configuring an inter-router connection in a communications network, the method comprising: presenting a physical connection entry interface to a user for one-time entry of physical connection information pertaining to a physical configuration of said inter-router connection; and presenting a protocol entry interface to said user for one-time entry of network protocol information pertaining to a networking protocols configuration of said inter-router connection.

Some embodiments of the invention further provide for presenting a transport and protocol profile interface to said user for selecting, editing, creating, saving, and deleting transport and protocol profiles wherein each transport and protocol profile comprises said network protocol information.

Some embodiments of the invention further provide for presenting an interface element to a user; and using said physical connection information and said network protocol information to create and configure said inter-router connection in said communications network.

Some embodiments of the invention further provide for configuring said first network interface according to said physical connection information; configuring said second network interface according to said physical connection information; associating said first network interface with said second network interface as participants in said inter-router connection; and configuring said set of networking protocols on said first and second routing instances and said set of networking protocols on said first and second network interfaces.

Some embodiments of the invention further provide for, in a case that said set of networking protocols includes BGP, configuring BGP AS, Confederation AS, and Member AS on each routing instance according to said BGP configuration information.

Some embodiments of the invention further provide for, in a case that said set of networking protocols comprises MPLS/LSP: creating a bi-directional MPLS/LSP transport between the networking interfaces according to said LSP configuration information, and creating SDPs in a case that a do not create service tunnels selection is not made, said SDPs, if any, being created to ride the MPLS/LSP transport.

Some embodiments of the invention further provide for, in a case that said set of networking protocols does not comprise MPLS/LSP: creating a bi-directional GRE transport between the networking interfaces; and creating SDPs in a case that a do not create service tunnels selection is not made, said SDPs, if any, being created to ride the GRE transport.

BRIEF DESCRIPTION OF THE DRAWINGS

The features and advantages of the invention will become more apparent from the following detailed description of the preferred embodiments with reference to the attached figures, wherein.

It is noted that in the attached figures, like features bear similar labels.

DETAILED DESCRIPTION OF THE PREFERRED EMBODIMENTS

Figure 3:
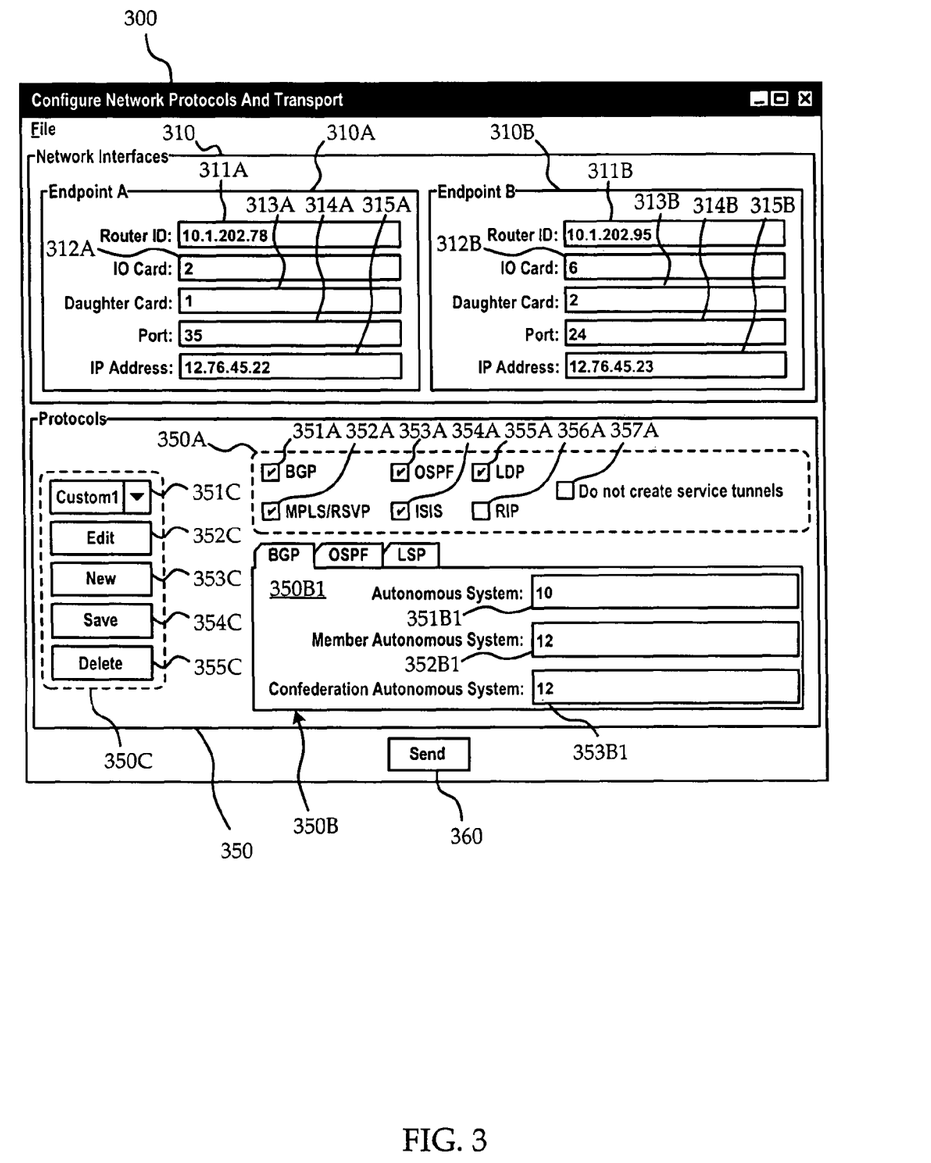
FIG. 3 is a diagram illustrating a GUI according to a preferred embodiment of the invention with a BGP submenu activated.
Figure 4:
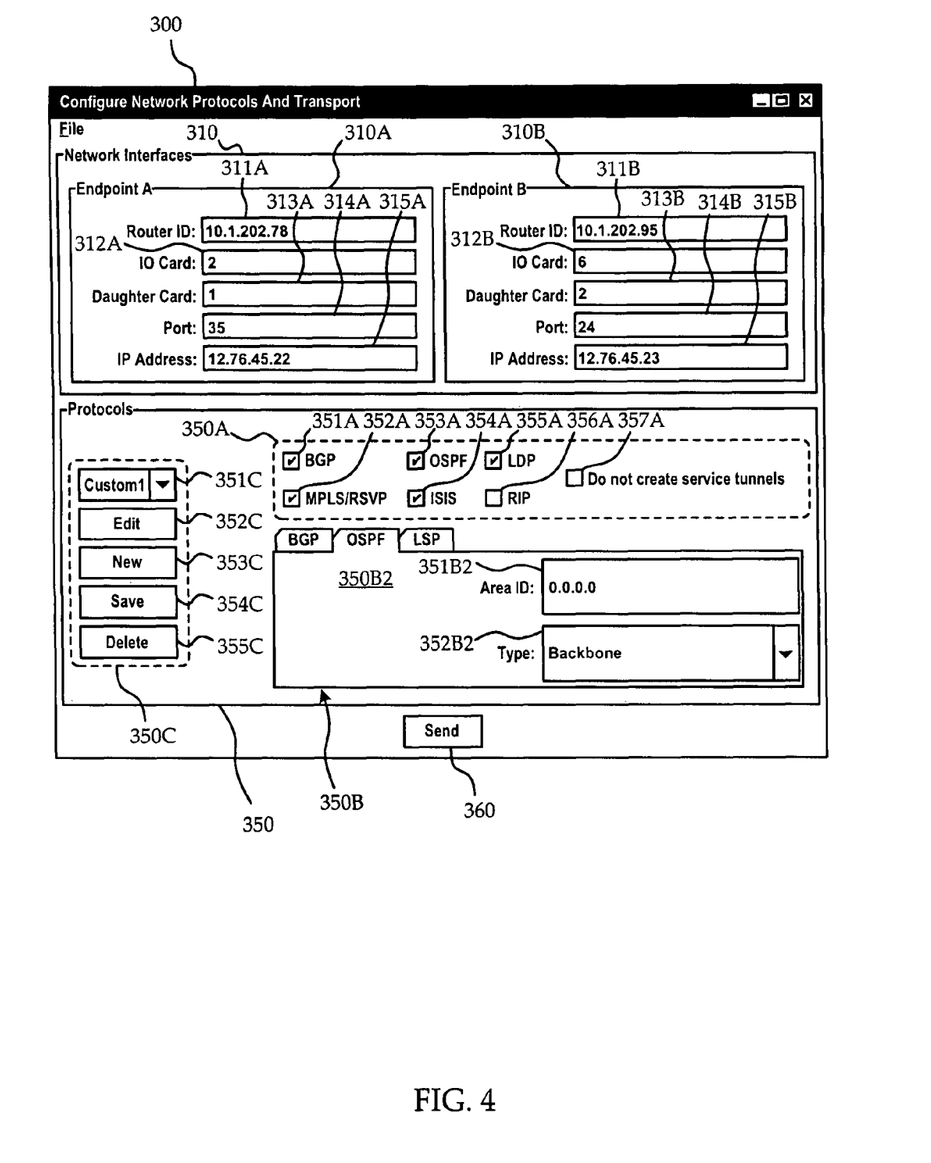
FIG. 4 is a diagram illustrating a GUI according to a preferred embodiment of the invention with an OSPF submenu activated.
Figure 5:
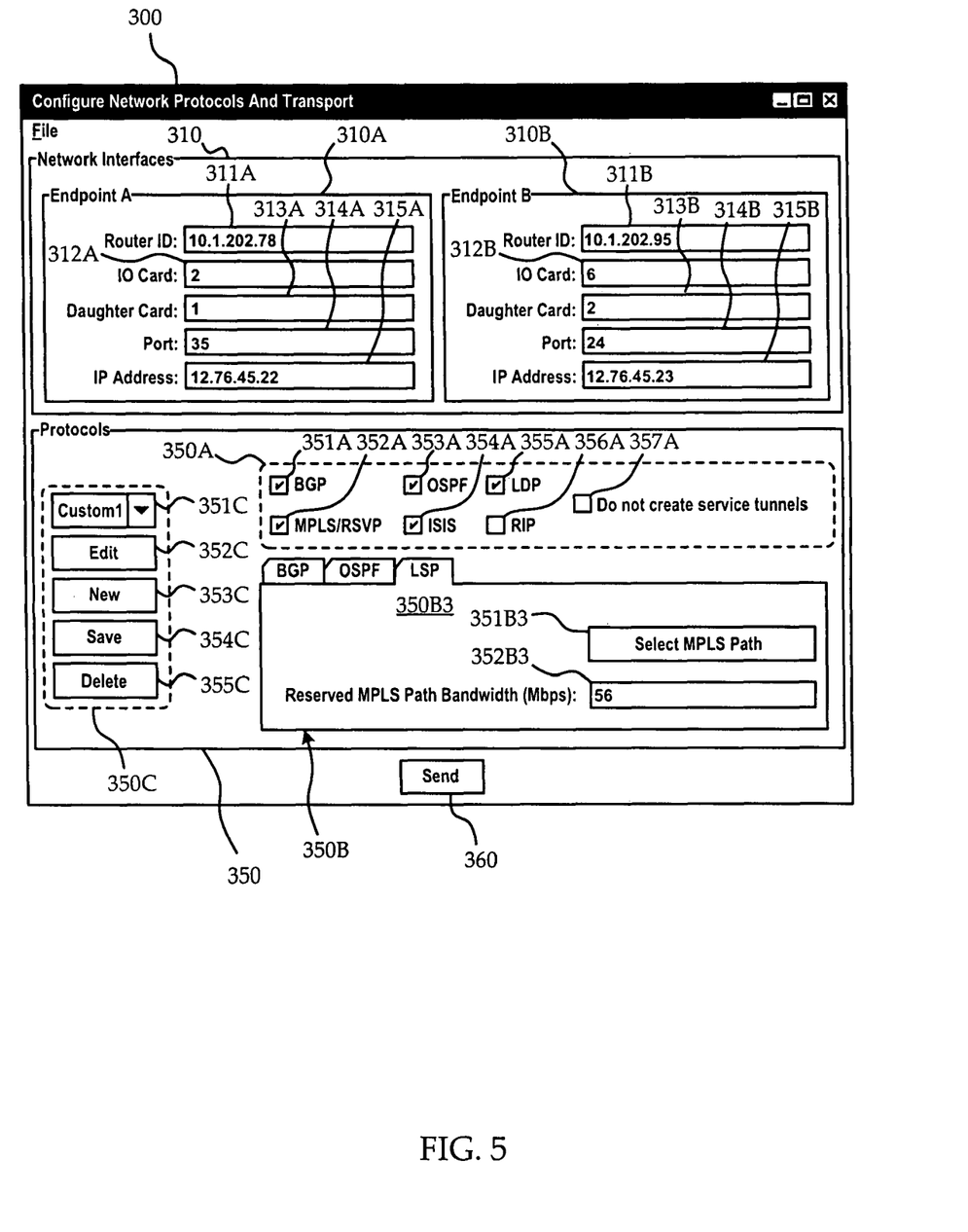
FIG. 5 is a diagram illustrating a GUI according to a preferred embodiment of the invention with a LSP submenu activated.

Referring now to FIGS. 3, 4, and 5 a GUI 300 according to the preferred embodiment will now be described. The GUI 300 primarily comprises a physical connection entry area 310 and a protocols entry area 350. As will be discussed below another embodiment provides a non-graphical user interface which, although non-graphical, provides the same number and type of entries as the GUI 300 depicted in FIGS. 3, 4, and 5.

As can be seen in each of FIGS. 3, 4, and 5, the single physical connection entry area 310 comprises endpoint entry areas 310A, 310B for each endpoint of the connection which is to be configured. Each endpoint entry area 310A, 310B comprises input fields for the endpoints of the connection. For example, the first endpoint entry area 310A for "Endpoint A" comprises a field to identify the routing instance 311A, and network interface parameters such as IO Card 312A, daughter card 313A, port 314A, and IP address 315A, which together identify the network interface of "Endpoint A" participating in the connection. Similarly, the second endpoint entry area 310B for "Endpoint B" comprises a field to identify its routing instance 311B, and fields to identify its network interface parameters such as IO Card 312B, daughter card 313B, port 314B, and IP address 315B, which together identify the network interface of "Endpoint B" participating in the connection. This physical connection entry area 310 simultaneously creates and configures the network interfaces, associates the network interfaces to each other, and associates each network interface with its corresponding routing instance.

The protocols entry area 350 comprises a protocol selection area 350A, a protocol configuration area 350B, and a protocol and transport profiles area 350C.

The protocol selection area 350A comprises a number of checkboxes with captions corresponding to a protocol which will be used when the checkbox is checked. In the protocol selection area 350A of the preferred embodiment there are a total of six protocol checkboxes, a BGP checkbox 351A, an MPLS/RSVP checkbox 352A, an OSPF checkbox 353A, an ISIS checkbox 354A, an LDP checkbox 355A, and a RIP checkbox 356A. In addition to the BGP, MPLS/RSVP, OSPF, ISIS, LDP, and RIP checkboxes 351A, 352A, 353A, 354A, 355A, 356A is a no service tunnels checkbox 357A labeled "Do not create service tunnels" which when checked directs that service tunnels are not to be created when configuring the connection between endpoints A and B.

The protocol configuration area 350B has three tabs which bring up respective view panes, namely, a BGP configuration pane 350B1, an OSPF configuration pane 350B2, and an LSP configuration pane 350B3.

FIG. 3 depicts the protocol configuration area 350B with the BGP configuration pane 350B1 selected. The BGP configuration pane 350B1 comprises fields for entering AS settings for BGP, the "Autonomous System" field 351B1 to configure the BGP AS, the "Member Autonomous System" field 352B1 to configure the Member AS, and the "Confederation Autonomous System" field 353B1 to configure the Confederation AS.

FIG. 4 depicts the protocol configuration area 350B with the OSPF configuration pane 350B2 selected. The OSPF configuration pane 350B2 comprises a field for an Area ID 351B2 and an associated type 352B2 which is selected from a list of existing types with use of a spin button. This OSPF configuration pane 350B2 can only be activated if the OSPF checkbox 353A is checked in the protocol selection area 350A.

FIG. 5 depicts the protocol configuration area 350B with the LSP configuration pane 350B3 selected. The LSP configuration pane 350B3 comprises a "Select MPLS Path" button 351B3, and a field for entry of the "Reserved MPLS Path Bandwidth (Mbps)" 352B3. This LSP configuration pane 350B3 can only be activated if the MPLS/RSVP checkbox 352A is checked in the protocol selection area 350A. When a user clicks on the "Select MPLS Path" button 351B3, a child window and application is launched for the user to create the required MPLS paths or select pre-existing MPLS paths.

The protocol and transport profiles area 350C allows selecting, editing, creating, saving, and deleting protocol and transport profiles which comprise the information in the protocol selection area 350A and the protocol configuration area 350B. A previously created and saved profile may be chosen using the combo or list box 351C and edited by clicking on the Edit button 352C. To create a new profile the New button 353C is clicked, while to save a profile, the Save button 354C is clicked. In order to delete a profile chosen in the combo or list box 351C, the Delete button 355C may be clicked. By providing this interface for saving and using protocol and transport profiles, separate connections having the same protocol and transport selections and configurations need not be created separately from scratch, i.e. the same profile may be reused for a number of similar connections.

From FIGS. 3, 4, and 5 it can be seen that the use of the single GUI 300 enables collection of the relevant data for creation and configuration of a connection between two endpoints without requiring the user to go through the laborious, time consuming, inefficient, and repetitious exercise of configuring network interfaces, routing instances, network protocols, network protocol configurations, and various associations therebetween separately.

The physical connection area 310 of the GUI 300 provides for simultaneous configuration of the network interfaces, association of each network interface with its respective router instance, and association of the network interfaces with each other as a pair of endpoints of the connection.

The protocols entry area 350 of the GUI 300 provides for the simultaneous configuration and selection of the network protocols which are to be used on both of the network interfaces and both of the routing instances participating in the connection. It also provides for selecting, editing, creating, saving, and deleting transport and protocol profiles which include a reusable set of protocol selection and protocol configuration information.

In general the GUI 300 of the preferred embodiment is a less laborious, less time consuming, more efficient, and far less repetitious interface for use in the creation and configuration of connections between routing instances.

A "Send" button 360 is provided at the bottom of the GUI 300 to initiate creation of the connection between the endpoints as configured in the physical connection entry area 310 and the protocols entry area 350.

Figure 6:
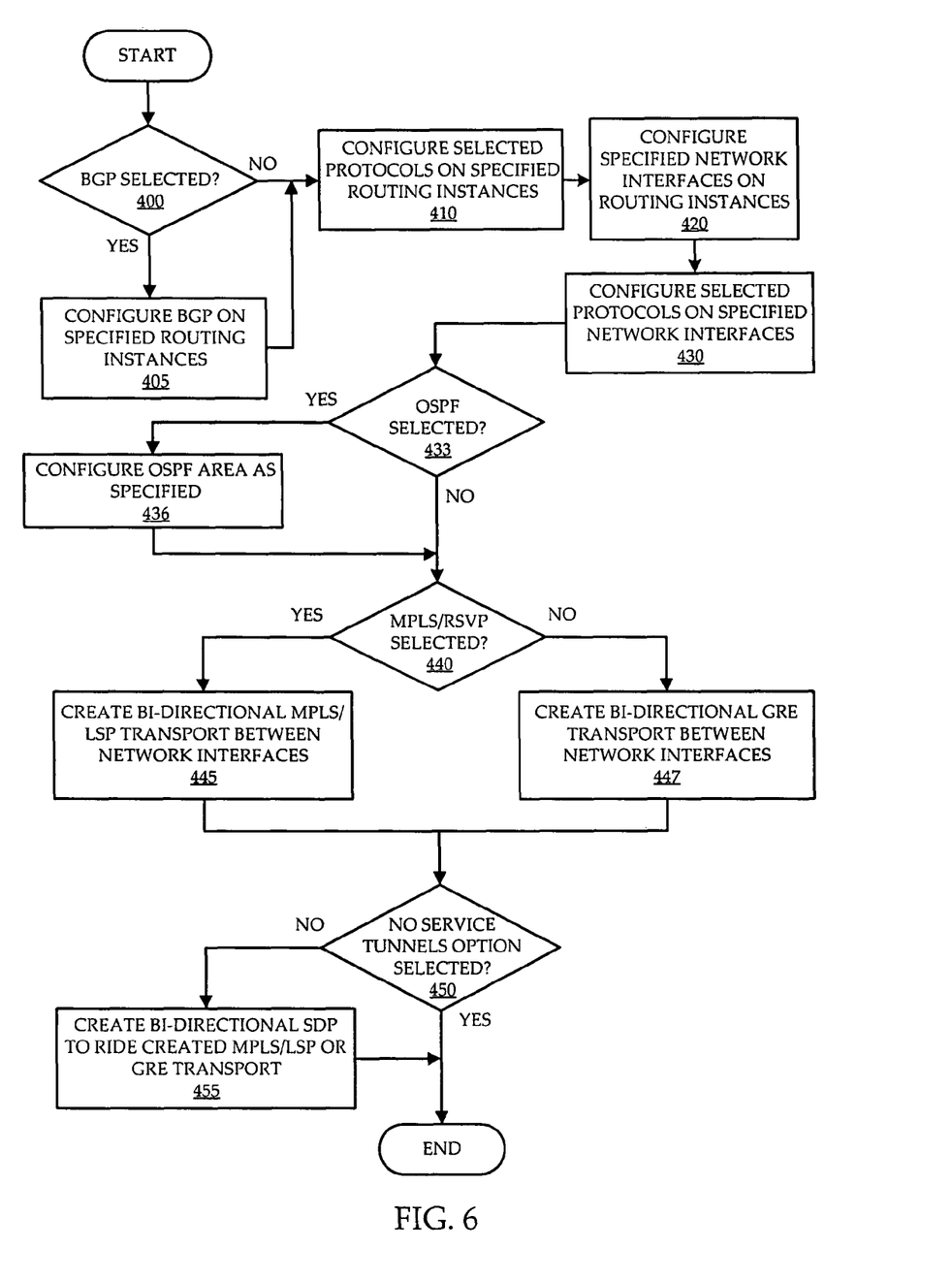
FIG. 6 is a block flow diagram illustrating the steps performed by the GUI of the preferred embodiment.

Referring now also to FIG. 6, steps taken by an NMS to actually create the connection specified in the GUI 300 will now be discussed. After the "Send" button is clicked by the user, the NMS receives all of the fields of the GUI 300 that have been input or selected. The NMS uses the information entered into the GUI 300 to perform the following steps.

At step 400 the NMS checks to see if BGP is selected by checking if the BGP box 351A is checked, if the BGP box 351A is checked, the NMS configures BGP on the routing instances specified in the physical connection entry area 310 in the router ID fields 311A and 311B. This is performed by determining if BGP according to the BGP AS settings of the fields in the BGP configuration pane 350B1, namely the settings in the BGP AS 351B1, the Member AS 352B1, and the Confederation AS 353B1 fields, has already been established, and if not, enabling it on each specified routing instance according to said BGP AS settings.

At step 410 the NMS configures the protocols selected in the protocols selection area 350 on the routing instances specified in the physical connection entry area 310 by way of the router ID fields 311A and 311B. This is performed by checking which of the selected protocols are already established on each specified routing instance, and for the selected protocols not already established, enabling them on each specified routing instance. In the example screen of FIGS. 3, 4, and 5, the selected protocols are BGP, MPLS/RSVP, OSPF, ISIS, LDP, while RIP is not selected. This selection of protocols results from the BGP, MPLS/RSVP, OSPF, ISIS, and LDP checkboxes being checked while the RIP checkbox is unchecked.

At step 420, the NMS configures the specified network interfaces according to the settings in the physical connection entry area 310. This is performed by determining if each specified network interface has already been established on its respective specified routing instance, and if a specified network interface has not already been established on its respective specified routing instance, creating it on its routing instance according to the settings in the physical connection entry area 310. For the network interface of Endpoint A, settings of the first endpoint entry area 310A, namely, the settings in the IO Card 312A field, the Daughter Card 313A field, the Port 314A field and the IP Address 315A field are used, while for the network interface of Endpoint B, settings of the second endpoint entry area 310B, namely, the settings in the IO Card 312B field, the Daughter Card 313B field, the Port 314B field and the IP Address 315B field are used.

At step 430, the NMS enables the protocols selected in the protocols selection area 350 on the network interfaces specified in the physical connection entry area 310 as discussed above. This is performed by checking which of the selected protocols are already associated with each specified network interface, and for the selected protocols not already associated with a specified network interface, associating them with the specified network interface. In the example screen of FIGS. 3, 4, and 5, the selected protocols are BGP, MPLS/RSVP, OSPF, ISIS, LDP, while RIP is not selected. This selection of protocols results from the BGP, MPLS/RSVP, OSPF, ISIS, and LDP checkboxes 351A, 352A, 353A, 354A, 355A being checked while the RIP checkbox 356A is unchecked.

At step 433 the NMS checks whether or not OSPF is selected by checking if the OSPF checkbox 353A is checked.

If the OSPF checkbox 353A is checked, the NMS configures an OSPF area according to the specifications in the OSPF configuration pane 350B2, by checking whether the OSPF area already exists, and by creating an OSPF Area if one does not already exist.

At step 440 the NMS checks whether or not MPLS/RSVP is selected by checking if the MPLS/RSVP checkbox 352A is checked. If the MPLS/RSVP checkbox 352A is checked, then the NMS creates bi-directional MPLS/LSP transport between the specified network interfaces of Endpoints A and B at step 445. This step includes creation of the MPLS path and the LSP to ride the MPLS path. If the MPLS/RSVP checkbox 352A is not checked, the NMS creates bi-directional GRE transport between the specified network interfaces of Endpoints A and B at step 447.

At step 450 the NMS checks whether or not the no service tunnels option is selected by checking if the no service tunnels option checkbox 357A is checked. If the no service tunnels checkbox 357A is not checked, the NMS proceeds to create bi-directional SDP tunnels at step 455 to ride the created MPLS/LSP transport or the GRE transport and the process ends. If the no service tunnels checkbox 357A is checked then the process ends without the NMS creating any SDP tunnels for the connection.

From FIG. 6, it can be seen that the use of the single GUI 300 enables the NMS to collect all of the data required to set-up the connection which comprises a number of various steps. Redundant re-entry of information into the NMS due to the use of multiple GUIs and application sessions at various stages of the configuration according to known methods is thereby avoided.

It should be understood that although the preferred embodiment has been described in terms of a graphical user interface, another preferred embodiment provides for entry of the same information the same number of times as that provided by the graphical user interface 300 of FIGS. 3, 4, and 5. The non-graphical interface of this embodiment is in the form of an interface to an OSS script, and comprises entries for the same information and for launching the same functionality as that of the GUI 300 of FIGS. 3, 4, and 5. For example, the OSS script interface of the preferred embodiment allows for entry of two routing instances, and selection and configuration of two respective network interfaces which define the physical endpoints of the connection. The interface into the OSS script also accepts a single specification and configuration of the routing protocols which are to be applied to both routing instances and both network interfaces. The interface to the OSS scripts would also be provided with functionality to create, edit, select, save and delete transport and protocol profiles.

It should be understood that the particular method of entry of information is not as important as the number of times certain information is provided, namely, all information for the connection is provided once to the interface before it is sent to the NMS for creation of the actual connection itself.

It should also be readily understood by any person skilled in the art that interface systems of any embodiment according to the invention may be implemented on any appropriate kind of processing and interfacing platform having an appropriate display, input means, and processing means to execute machine readable code which determines the functioning of the interface system, the processing means of which may be implemented in hardware, software or any combination thereof, and which may be located locally or remotely from said display and input means.

The embodiments presented are exemplary only and persons skilled in the art would appreciate that variations to the embodiments described above may be made without departing from the spirit of the invention. The scope of the invention is solely defined by the appended claims.

We claim:

1. A user interface system for inter-router connection configuration in a communications network, the user interface comprising:
   a physical connection entry interface for one-time entry of physical connection information pertaining to a physical configuration of said inter-router connection, wherein the physical connection information identifies a first routing instance participating in said inter-router connection and a second routing instance participating in said inter-router connection, and wherein said physical connection information is for use in configuring a first network interface of said first routing instance and for use in configuring a second network interface of said second routing instance, said first and second network interfaces participating in said inter-router connection;
   a protocol entry interface for one-time entry of network protocol information pertaining to a networking protocols configuration of said inter-router connection; and
   a transport and protocol profile interface for selecting, editing, creating, saying, and deleting transport and protocol profiles wherein each transport and protocol profile comprises said network protocol information.

2. A user interface system for inter-router connection configuration in a communications network, the user interface comprising:
   a physical connection entry interface for one-time entry of physical connection information pertaining to a physical configuration of said inter-router connection, wherein the physical connection information identifies a first routing instance participating in said inter-router connection and a second routing instance participating in said inter-router connection, and wherein said physical connection information is for use in configuring a first network interface of said first routing instance and for use in configuring a second network interface of said second routing instance, said first and second network interfaces participating in said inter-router connection; and
   a protocol entry interface for one-time entry of network protocol information pertaining to a networking protocols configuration of said inter-router connection, wherein said network protocol information identifies a set of networking protocols for use over said inter-router connection, and wherein said network protocol information is for use in configuring said set of networking protocols, wherein said network protocol information is used to configure said set of network protocols on each of said first routing instance, said second routing instance, said first network interface, and said second network interface.

3. A user interface system according to claim 2 wherein said first and second routing instance is identified by a respective first and second router ID of said physical connection information, and wherein said physical connection information comprises a first IO Card entry, a first Daughter Card entry, a first Port entry, and a first IP Address entry, for use in creating and configuring said first networking interface, and a second IO Card entry, a second Daughter Card entry, a second Port entry, and a second IP Address entry, for use in configuring said second networking interface.

4. A user interface system according to claim 3 wherein said set of networking protocols comprises at least one of border gateway protocol (BGP), multi-protocol label switching/resource reservation protocol (MPLS/RSVP), open shortest path first (OSPF), intermediate system to intermediate system (ISIS), label distribution protocol (LDP), and routing information protocol (RIP), and wherein said network protocol information comprises, in a case that said set of networking protocols comprises BGP, BGP configuration information, wherein said network protocol information comprises, in a case that said set of networking protocols comprises OSPF, OSPF configuration information, and wherein said network protocol information comprises, in a case that said set of networking protocols comprises MPLS/RSVP, label switched path (LSP) configuration information.

5. A user interface system according to claim 4 wherein said BGP configuration information comprises a BGP Autonomous System setting, a Member Autonomous System setting, and a Confederation Autonomous System setting, and wherein said OSPF configuration information comprises an Area ID setting and a OSPF type setting, and wherein said LSP configuration information comprises an multi-protocol label switching (MPLS) path selection and a reserved MPLS path bandwidth setting.

6. A user interface system according to claim 2 further comprising an interface element which when engaged initiates the use of said physical connection information and said network protocol information in the creation and configuration of said inter-router connection in said communications network.

7. A user interface system according to claim 6 wherein once said interface has been engaged, said first network interface is configured according to said physical connection information, said second network interface is configured according to said physical connection information, said first network interface is associated with said second network interface as participants in said inter-router connection, and said set of networking protocols is configured on said first and second routing instances and said set of networking protocols is configured on said first and second network interfaces.

8. A user interface system according to claim 7 wherein said set of networking protocols is configured on said first and second routing instances by configuring border gateway protocol (BGP) Autonomous System (AS), Confederation AS, and Member AS on each routing instance in a case that said set of networking protocols includes BGP.

9. A user interface system according to claim 8 wherein said set of networking protocols is configured on said first and second routing instances by checking which protocols of said set of protocols has not already been established on said first and second routing instances, and for protocols which have not been established on said first and second routing instances, enabling them on said first and second routing instances, wherein said set of networking protocols is configured on said network interfaces by checking which protocols of said set of protocols are already associated with each network interface, and for protocols which have not already been associated with said network interfaces, associating them with the network interfaces, and wherein once said set of networking protocols has been associated with said first and second network interfaces, in a case that said set of networking protocols comprises multi-protocol label switching/label switched path (MPLS/LSP), a bi-directional MPLS/LSP transport is created between the networking interfaces, and requested service distribution paths (SDPs) if any are created to ride the MPLS/LSP transport.

10. A user interface system according to claim 8 wherein once said set of networking protocols has been associated with said first and second network interfaces, in a case that said set of networking protocols does not comprise multi-protocol label switching/label switched path (MPLS/LSP), a bi-directional generic routing protocol (GRE) transport is created between the networking interfaces, and requested service distribution paths (SDPs) if any are created to ride the GRE transport.

11. A method of configuring an inter-router connection in a communications network, the method comprising:
   presenting a physical connection entry interface to a user for one-time entry of physical connection information pertaining to a physical configuration of said inter-router connection, wherein the physical connection information identifies a first routing instance participating in said inter-router connection and a second routing instance participating in said inter-router connection, and wherein said physical connection information is for use in configuring a first network interface of said first routing instance and for use in configuring a second network interface of said second routing instance, said first and second network interfaces participating in said inter-router connection;

presenting a protocol entry interface to said user for one-time entry of network protocol information pertaining to a networking protocols configuration of said inter-router connection; and presenting a transport and protocol profile interface to said user for selecting, editing, creating, saving, and deleting transport and protocol profiles wherein each transport and protocol profile comprises said network protocol information.

12. A method of configuring an inter-router connection in a communications network, the method comprising:

presenting a physical connection entry interface to a user for one-time entry of physical connection information pertaining to a physical configuration of said inter-router connection, wherein the physical connection information identifies a first routing instance participating in said inter-router connection and a second routing instance participating in said inter-router connection, and wherein said physical connection information is for use in configuring a first network interface of said first routing instance and for use in configuring a second network interface of said second routing instance, said first and second network interfaces participating in said inter-router connection; and presenting a protocol entry interface to said user for one-time entry of network protocol information pertaining to a networking protocols configuration of said inter-router connection, wherein said network protocol information identifies a set of networking protocols for use over said inter-router connection, and wherein said network protocol information is for use in configuring said set of networking protocols, wherein said network protocol information is used to configure said set of network protocols on each of said first routing instance, said second routing instance, said first network interface, and said second network interface.

13. A method according to claim 12 wherein said first and second routing instance is identified by a respective first and second router ID of said physical connection information, and wherein said physical connection information comprises a first IO Card entry, a first Daughter Card entry, a first Port entry, and a first IP Address entry, for use in configuring said first networking interface, and a second IO Card entry, a second Daughter Card entry, a second Port entry, and a second IP Address entry, for use in creating and configuring said second networking interface.

14. A method according to claim 13 wherein said set of networking protocols comprises at least one of border gateway protocol (BGP), multi-protocol label switching/resource reservation protocol (MPLS/RSVP), open shortest path first (OSPF), intermediate system to intermediate system (ISIS), label distribution protocol (LDP), and routing information protocol (RIP), and wherein said network protocol information comprises, in a case that said set of networking protocols comprises BGP, BGP configuration information, wherein said network protocol information comprises, in a case that said set of networking protocols comprises OSPF, OSPF configuration information, and wherein said network protocol information comprises, in a case that said set of networking protocols comprises MPLS/RSVP, label switched path (LSP) configuration information.

15. A method according to claim 14 wherein said BGP configuration information comprises a BGP Autonomous System setting, a Member Autonomous System setting, and a Confederation Autonomous System setting, and wherein said OSPF configuration information comprises an Area ID setting and a OSPF type setting, and wherein said LSP configuration information comprises an MPLS path selection and a reserved multi-protocol label switching (MPLS) path bandwidth setting.

16. A method according to claim 12 further comprising:
presenting an interface element to a user; and
using said physical connection information and said network protocol information to create and configure said inter-router connection in said communications network.

17. A method according to claim 16 further comprising:
configuring said first network interface according to said physical connection information;
configuring said second network interface according to said physical connection information;
associating said first network interface with said second network interface as participants in said inter-router connection; and
configuring said set of networking protocols on said first and second routing instances and said set of networking protocols on said first and second network interfaces.

18. A method according to claim 17 wherein the method further comprises in a case that said set of networking protocols includes border gateway protocol (BGP), configuring BGP Autonomous System (AS), Confederation AS, and Member AS on each routing instance according to said BGP configuration information.

19. A method according to claim 18 wherein the method further comprises in a case that said set of networking protocols comprises multi-protocol label switching/label switched path (MPLS/LSP):
creating a bi-directional MPLS/LSP transport between the networking interfaces according to said LSP configuration information, and
creating service distribution paths (SDPs) in a case that a do not create service tunnels selection is not made, said SDPs, if any, being created to ride the MPLS/LSP transport.

20. A method according to claim 18 wherein the method further comprises in a case that said set of networking protocols does not comprise multi-protocol label switching/label switched path (MPLS/LSP):
creating a bi-directional generic routing protocol (GRE) transport between the networking interfaces; and
creating service distribution paths (SDPs) in a case that a do not create service tunnels selection is not made, said SDPs, if any, being created to ride the GRE transport.

* * * * *